United States Patent [19]

Attwood

[11] Patent Number: 4,911,406
[45] Date of Patent: Mar. 27, 1990

[54] FLUID CONDUIT COUPLING APPARATUS

[75] Inventor: David N. Attwood, Edmonds, Wash.

[73] Assignee: Accor Technology, Inc., Bellevue, Wash.

[21] Appl. No.: 295,975

[22] Filed: Jan. 11, 1989

[51] Int. Cl.$^4$ .............................................. F16K 51/00
[52] U.S. Cl. ..................................... 251/148; 285/340
[58] Field of Search ................... 251/148; 285/40, 340

[56] References Cited

U.S. PATENT DOCUMENTS

| | | | |
|---|---|---|---|
| 2,484,192 | 10/1949 | Squiller | 285/340 |
| 4,181,329 | 1/1980 | Helm | 285/340 |
| 4,390,159 | 6/1983 | Duncan | 285/340 |
| 4,777,669 | 10/1988 | Rogus | 285/340 |

FOREIGN PATENT DOCUMENTS

| | | | |
|---|---|---|---|
| 74101723 | 1/1974 | China . | |
| 1489083 | 4/1974 | United Kingdom | 251/148 |

Primary Examiner—A. Michael Chambers
Attorney, Agent, or Firm—Seed and Berry

[57] ABSTRACT

A quick connect coupling for fluid conduits having an outer cylindrical member and an inner conduit fitted within the outer cylindrical member including a continuous circular gripper ring seated in the outer cylindrical member and having radially inward gripper teeth bent axially forward toward the outer cylindrical member in a generally conical plane, each tooth has a twist in a common direction whereby the inner conduit can be slid into the gripper ring but removed from the gripper ring only by unscrewing from the gripper ring.

6 Claims, 1 Drawing Sheet

FLUID CONDUIT COUPLING APPARATUS

DESCRIPTION TECHNICAL FIELD

This invention pertains to quick connect fluid coupling apparatus in which the one fluid conduit is connected in fluid tight arrangement to another fluid conduit for use in couplings, valves and the like. More particularly, the invention is directed to an improved gripper ring which allows the one tubular conduit to be slidably engaged within the other fluid conduit, but allows release of the first fluid coupling only by threading outwardly from the second tubular conduit.

DESCRIPTION OF THE PRIOR ART

U.S. Pat. No. 4,390,159 describes various embodiments of a valve and tubular conduit coupling device in which a split gripper ring having radially inner sharpened teeth will slidably receive one tubular conduit when inserted in one axial direction, but will lock or hold that tubular conduit from retraction in a straight line rearward axial direction. Release of the tubular conduit, however, can be accomplished by threading the inserted tubular conduit outwardly relative to the gripper ring. This type of coupling device has the advantage of being connected in fluid tight arrangement without the use of tools and with a minimum of time expended. While it holds the inserted tubular conduit tightly in fluid tight gripping arrangement, it offers the additional advantage of allowing the inserted tubular coupling to be threadably removed without destroying the gripper teeth. Thus, if the tubular conduit should become cracked or otherwise needs servicing, it is not necessary to destroy the whole coupling apparatus, but rather necessary only to unscrew the inserted tubular coupling and replace it with a new tubular coupling. In the alternative, the conduit could be removed and reused, if desired.

SUMMARY OF THE INVENTION

It is an object of this invention to provide a low cost, easily assembled, tubular coupling.

It is another object of this invention to provide an improved gripper ring for a tubular coupling.

Basically, the invention includes an inner cylindrical surface in a first tubular member, an outer cylindrical surface slightly smaller in diameter than the inner cylindrical surface of the first tubular member in a second tubular member, means sealingly engaging the inner and outer cylindrical surfaces of said first and second tubular members, and gripping apparatus held in said inner cylindrical surface of said first tubular member and releasably locked to the outer cylindrical surface of said second tubular member, said gripping apparatus having a plurality of radially inner circumferentially spaced teeth having radially inner sharp edges, said teeth extending radially inward and axially forward, along a generally conical plane and each tooth having a slight rotational twist in a common direction whereby the second tubular member can be slid past said teeth when inserted axially in a direction of convergence of said conical plane of the teeth, but can be removed without destruction of said teeth only by unscrewing the second tubular member relative to said teeth.

In one embodiment, the gripping apparatus is provided within a valve body. In additional embodiments, the gripping apparatus is provided within couplings for joining two tubular conduits or joining elbows and the like.

DETAILED DESCRIPTION OF THE INVENTION

Figure 3:
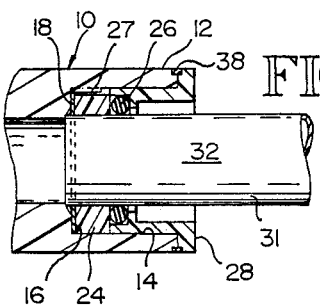
FIG. 3 is a section of a typical coupler embodying the principle of the invention.
Figure 2:
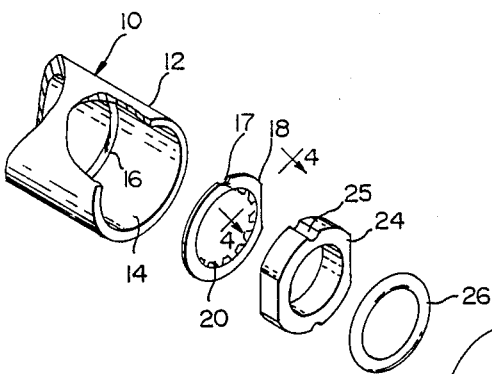
FIG. 2 is an exploded view of the parts shown in FIG. 3.
Figure 5:
FIG. 5 is a schematic illustration of a typical coupler of the type shown in FIG. 3.

As best shown in FIGS. 2 and 3, a coupling 10 includes a cylindrical housing 12 having an axial bore defining an inner cylindrical surface 14 and terminating in an inner shoulder 16. Seated against the inner shoulder is an improved gripper ring 18 having a plurality of radially inward teeth 20 terminating in sharp edges 21.

Figure 4:
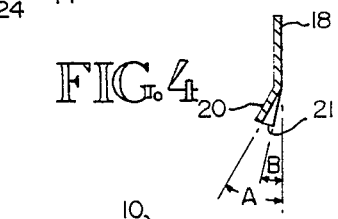
FIG. 4 is a fragmentary section taken along the line 4—4 of FIG. 2.

As best shown in FIGS. 2 and 4, the gripper ring is a continuous cylindrical ring with the teeth 20 being bent axially forward in a generally converging conical plane at an angle of approximately 30° as shown by the letter "B" in FIG. 4. Each tooth is also given an additional twist in a common direction such that the forward most edge of the tooth is bent at an angle of about 33° as shown by the reference character "A" in FIG. 4. This conical and twist arrangement of the teeth allows a tubular conduit to be slid past the sharp edges of the ends of the teeth 21, when the tubular conduit is being inserted to the left in FIGS. 2 and 4. The teeth will bite into the tubular conduit, however, if the tubular conduit is retracted in a straight line in FIGS. 2 and 4. Thus, the tubular conduit is held tightly within the inner cylindrical surface 14. However, the tubular conduit can be removed by threading the tubular conduit outwardly with the teeth scribing a line in the material of the conduit. Thus, the conduit can be advantageously removed if necessary by unscrewing one of the conduits relative to the other, but in normal operation will remain locked together by the teeth of the gripper ring. The solid gripper ring is to be contrasted with the gripper ring shown in U.S. Pat. No. 4,390,159. The scope of that patent was intended to cover any type of gripper ring, solid or discontinuous allowing unscrewing of the conduit, with this embodiment of this invention, however, being an improvement in providing the same kind of spiral removal, but doing it with a twist in the teeth of the gripper ring.

A notch 17 in the gripper ring fits over a flange 27 in the coupling to prevent rotation of the gripper ring.

In addition to the gripper ring 18, a bushing 24 is positioned against the gripper ring to hold it firmly against the inner shoulder 16. An O-ring seal 26 is rested against the bushing 16. An end bushing 28 is then snapped into the tubular housing 12 and held by sonic welding or other means for securing the end bushing to the housing 12. The inner end 30 of the end bushing 28 rests against the O-ring seal and compresses the seal so that it expands radially, outwardly and inwardly to form a fluid-tight seal between an outer cylindrical surface 31 on an inner-tubular conduit 32 and the inner cylindrical 14 of the housing 12. A sonic weld is shown at 38.

FIG. 3 shows the coupling of FIG. 2 in a sectional view with like reference numerals being illustrated.

Figure 1:
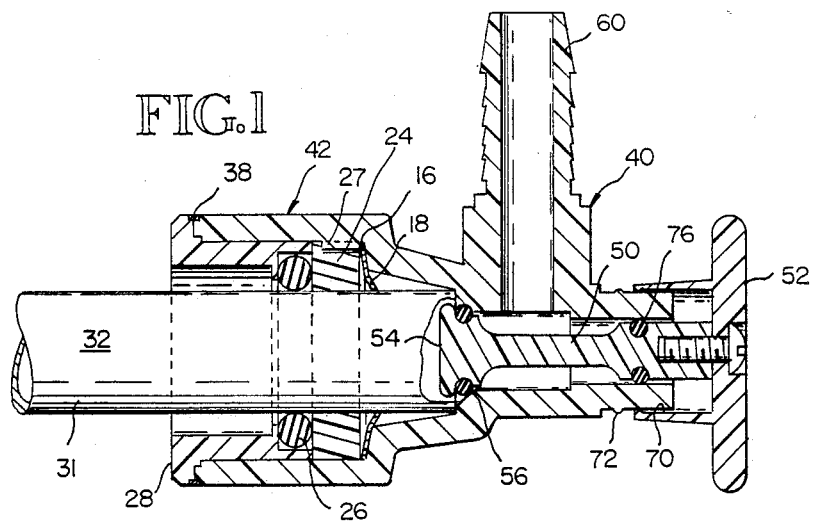
FIG. 1 is a section of a valve body illustrating the invention.
Figure 1A:
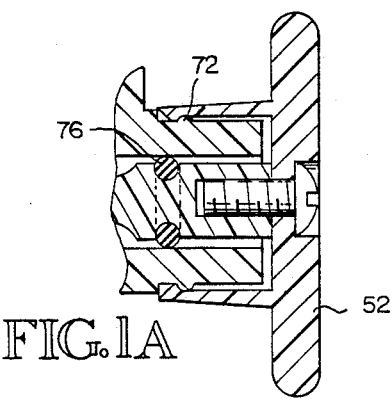
FIG. 1A is a fragmentary detail of the valve body shown in FIG. 1.

As shown in FIG. 1, the coupling arrangement can be embodied in a valve body 40 having a radially outer cylindrical housing 42 terminating in the shoulder 16. The remaining parts are as illustrated in FIGS. 1 and 1A and include the O-ring seal 26, the gripper ring 18 and the bushing 24 held in by the end bushing 28. A notch 25 engages a flange 27 to prevent rotation of the bushing.

The valve body of FIG. 1, however, also includes a valve stem 50 terminating at one end in an actuator 52 and a valve member 54. The valve member has an O-ring 56 that rests on a valve seat 58. A second port 60 is joined to the valve body. The valve actuator 52 is provided with an inner surface 70 that rides over a detent 72 to snap the valve in an open position holding the valve member 54 open. A second O-ring 76 seals the valve stem against the valve body to prevent fluid moving out around the valve stem.

While the preferred embodiments of the invention have been illustrated and described, it should be understood that variations will be apparent to one skilled in the art without departing from the principles herein. Accordingly, the invention is not to be limited to the specific embodiments illustrated in the drawings.

I claim:

1. Fluid conduit coupling apparatus, comprising:
    a conduit housing having a circular bore, an axially inner shoulder, and a flange extending radially inward from said circular bore;
    a bushing seated in said circular bore;
    a sealing member seated in said circular bore;
    a seal retainer for holding said seal within said circular bore; and
    a circular gripper rings, said gripper ring having a plurality of inner circumferentially spaced teeth forming an inner circle of said ring and the inner circle adapted to be of a diameter less than a tubular fluid conduit to be inserted therein whereby a frictional engagement occurs between the conduit and said teeth, with the teeth being elastically deformed axially forwardly as the conduit is inserted, said gripper ring having a notch corresponding to the flange of said circular bore to prevent rotation of said gripper ring relative to said circular bore, said teeth having radially inner edges which dig into the conduit if the conduit is retracted straight out to hold the conduit within the housing, said teeth each lying generally in a radially inwardly converging conical plane, each tooth having a twist in a common direction at an angle to said conical plane whereby rotation of said conduit while being retracted will cause the conduit to thread out of said angled teeth.

2. The apparatus of claim 1, wherein the angle of twist of said teeth is about 3 degrees.

3. The apparatus of claim 2, wherein said sealing member is an O-ring seal.

4. The apparatus of claim 1, including a tubular conduit inserted into said housing within said gripper ring.

5. The apparatus of claim 1, wherein said conduit housing is a portion of a valve body, the valve body further including a side port, a passage joining said side port and said housing circular bore, a valve seat in said passage, and a valve stem joined to a valve closure member, said closure member being movable by said valve stem and having a sealing surface engageable with said valve seat for closing said passage.

6. Apparatus for removably connecting two concentric cylindrical tubular members, comprising:
    an inner cylindrical surface in a first of said tubular members having a flange extending radially inward from said inner cylindrical surface;
    an outer cylindrical surface slightly smaller in diameter than said inner cylindrical surface of said first tubular member in a second of said tubular members;
    means sealingly engaging the inner and outer cylindrical surface of said first and second tubular members; and
    gripper means held in said inner cylindrical surface of said first tubular member and releasably locked to the outer cylindrical surface of said second tubular member, said gripper means having a plurality of radially inner circumferentially spaced teeth having inner sharp edges, said gripper means having a notch corresponding to the flange of said inner cylindrical surface to prevent rotation of said gripper means relative to said inner cylindrical surface, said teeth extending radially inward and axially forward along a generally conical plane and each tooth having a slight rotational twist in a common direction whereby the second tubular member can be slid past said teeth when inserted axially forward in the direction of convergence of said conical plane of the teeth but can be removed without destruction of said teeth only by unscrewing the second tubular member relative to said teeth.

* * * * *